US012789582B2

(12) United States Patent
Sasanuma et al.

(10) Patent No.: US 12,789,582 B2
(45) Date of Patent: Nov. 10, 2026

(54) AIR CONDITIONING CONTROL DEVICE AND AIR CONDITIONING CONTROL METHOD

(71) Applicant: Nissan Motor Co., Ltd., Kanagawa (JP)

(72) Inventors: Yasutomo Sasanuma, Kanagawa (JP); Jun Ueda, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 375 days.

(21) Appl. No.: 18/566,602

(22) PCT Filed: Jun. 3, 2021

(86) PCT No.: PCT/JP2021/021218

§ 371 (c)(1),
(2) Date: Dec. 1, 2023

(87) PCT Pub. No.: WO2022/254660

PCT Pub. Date: Dec. 8, 2022

(65) Prior Publication Data

US 2024/0359528 A1 Oct. 31, 2024

(51) Int. Cl.
*B60H 1/00* (2006.01)

(52) U.S. Cl.
CPC ....... *B60H 1/0065* (2013.01); *B60H 1/00821* (2013.01)

(58) Field of Classification Search
CPC .. B60H 1/0065; B60H 1/00821; B60K 35/10; G06F 3/0481; G06F 3/0484
See application file for complete search history.

(56) References Cited

U.S. PATENT DOCUMENTS

2020/0081616 A1 3/2020 Takano et al.
2021/0048213 A1* 2/2021 Albrecht-Buehler ........................ B60H 1/00985

FOREIGN PATENT DOCUMENTS

DE 102013009603 A1 * 12/2014 ......... G06F 3/04847
DE 102018205690 A1 10/2019
DE 102019204043 A1 10/2020
EP 2896524 A1 * 7/2015 ............. B60K 35/22
EP 3067227 A1 * 9/2016 ......... G06F 3/04847
EP 2896524 B1 4/2018
JP 2013-097519 A 5/2013
JP 2019166926 A 10/2019

(Continued)

*Primary Examiner* — Allen R. B. Schult
(74) *Attorney, Agent, or Firm* — Osha Bergman Watanabe & Burton LLP

(57) ABSTRACT

An air conditioning control device that controls an air conditioner installed in a vehicle includes a controller that controls a display screen of a touch panel display and controls the air conditioner based on a touch operation on the display screen. The display screen includes a seat image representing a seat and a reference area image representing a reference area. The controller, in a case where the touch operation has a direction from the reference area image to the seat image, outputs a control command to increase airflow of air coming out from the air conditioner. The controller, in a case where the touch operation has a direction from the seat image to the reference area image, outputs a control command to decrease the airflow of the air coming out from the air conditioner.

13 Claims, 8 Drawing Sheets

(56) References Cited

FOREIGN PATENT DOCUMENTS

| | | | | |
|---|---|---|---|---|
| JP | 2020042602 A | | 3/2020 | |
| JP | 2020175819 A | | 10/2020 | |
| KR | 20160105587 A | * | 9/2016 | ......... B60H 1/00642 |
| WO | 2015146567 A1 | | 10/2015 | |

* cited by examiner

AIR CONDITIONING CONTROL DEVICE AND AIR CONDITIONING CONTROL METHOD

TECHNICAL FIELD

The present invention relates to an air conditioning control device and an air conditioning control method.

BACKGROUND ART

A touch-type operation input device for a vehicle is known that, by continuously touching a touch surface thereof, changes settings of a temperature setting and airflow setting for controlling an air conditioner. For example, an input device described in Patent Document 1 includes a running state specifying means for specifying whether a vehicle is running, a touch operation input means for receiving a continuous touch operation, and a control means for changing control parameters. On a temperature setting screen displayed on a screen display unit, memory images are drawn at equal intervals around a rotation axis, and guidance images that rotate around the rotation axis indicating the memory images are drawn, and these guidance images can be moved by sliding operations on the touch surface. By changing the indicated positions of the guidance images, the current set values of control parameters indicating the temperature setting and airflow setting can be changed, and even when the content of the operation for changing the set values of the control parameters is the same when the vehicle is running and when the vehicle is stopped, the content of the change is different.

PRIOR ART DOCUMENT

Patent Document

Patent Document 1: JP 2013-97519 A

SUMMARY OF INVENTION

Problems to be Solved by Invention

However, in the above-mentioned touch-type operation input device for a vehicle, the temperature setting screen displayed on the screen display unit only displays a memory indicating the magnitude of the temperature and a guidance image indicating the memory, and thus there is a problem in that a user cannot intuitively know which part inside the vehicle the air conditioning is to be controlled, and the operability is low.

The problem to be solved by the present invention is to provide an air conditioning control device and an air conditioning control method with improved operability.

Means for Solving Problems

The present invention solves the above-mentioned problems by: displaying a display screen including a seat image representing a seat and a reference area image representing a reference area on a touch panel display, and in a case where a touch operation on the display screen of the display has a direction from the reference area image to the seat image, outputting a control command to increase airflow of air coming out from an air conditioner, and in a case where a touch operation has a direction from the seat image to the reference area image, outputting a control command to decrease the airflow of the air coming out from the air conditioner.

Effects of Invention

With the present invention, it is possible to improve operability when operating an air conditioner by touch operation on a display screen.

MODES FOR CARRYING OUT THE INVENTION

Figure 1:
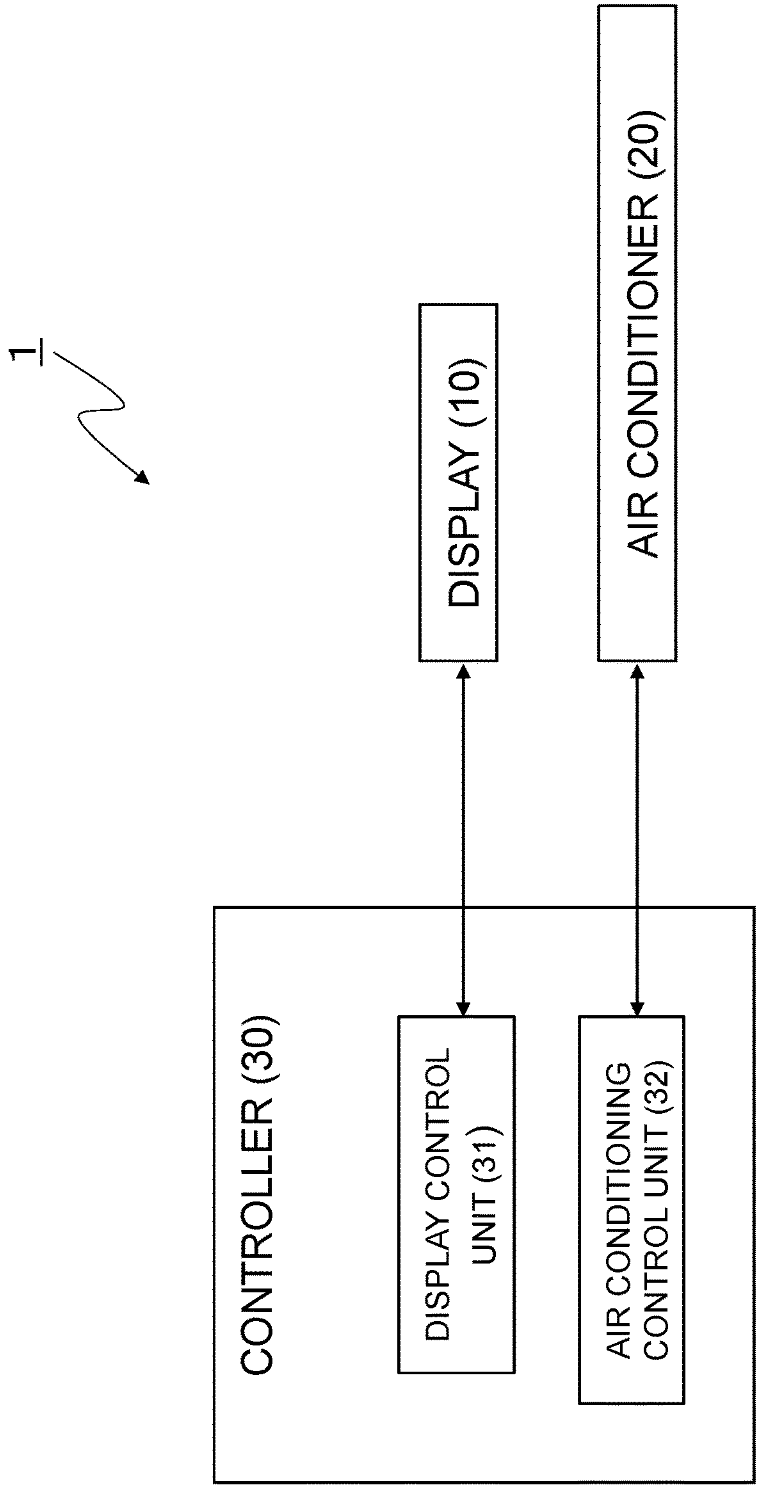
FIG. 1 is a block diagram illustrating an air conditioning control system according to an embodiment of the present invention.

An embodiment of an air conditioning control system according to the present invention will be described below based on the drawings. FIG. 1 is a block diagram illustrating an air conditioning control system according to an embodiment of the present invention. The air conditioning control system 1 is a system installed in a vehicle, and includes a display 10, an air conditioner 20, and a controller 30. The air conditioning control system 1 according to the present embodiment receives touch operations via the touch panel type display 10 and controls the air conditioner 20 based on the touch operations.

Figure 2:
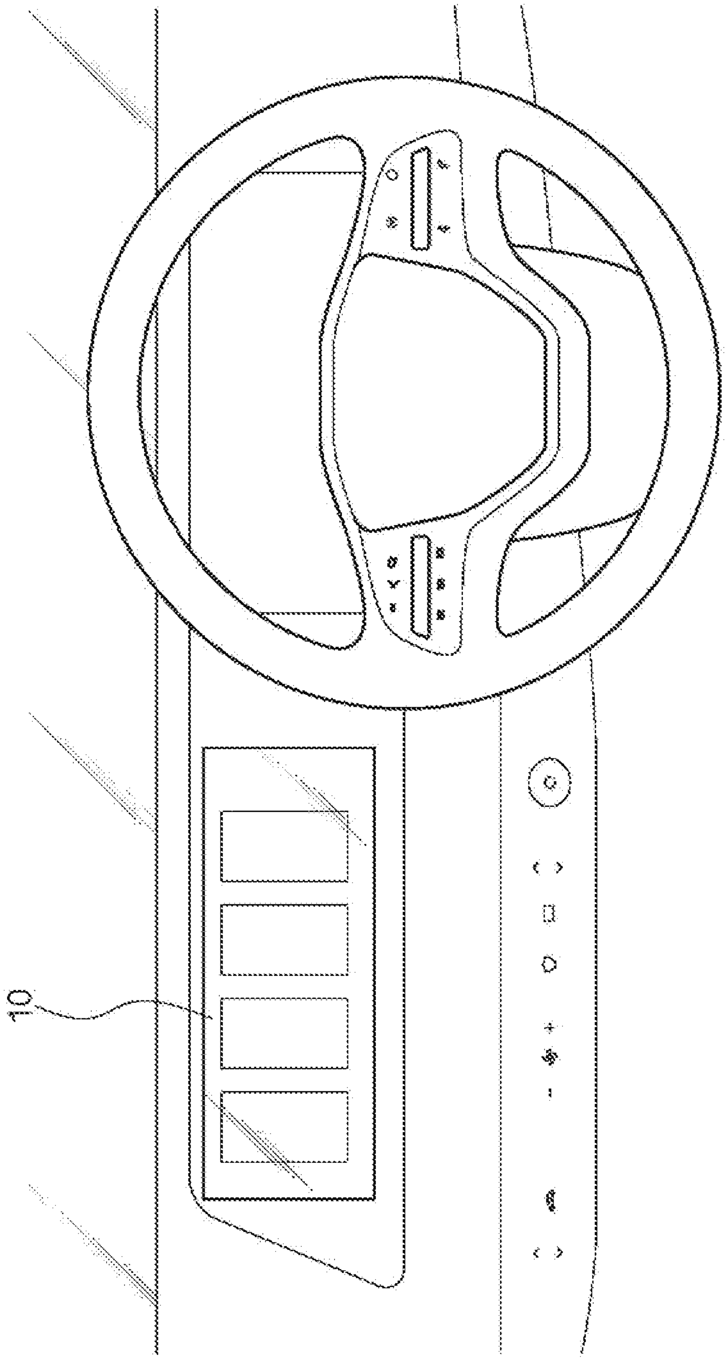
FIG. 2 is a front view of a dashboard with the display in FIG. 1.

The display 10 is a touch panel type display and is installed the vehicle. The touch panel type display 10 is provided with a pressure sensor, and detects a touch operation by a user by measuring the pressing force applied to the display 10 during a touch operation based on a resistance value, voltage, or the like. The mechanism of the pressure sensor is not particularly limited, and methods known at the time of filing may be used as appropriate. In addition, the touch panel is not limited to a pressure type, and may be another type such as an electrostatic type. FIG. 2 is a front view of the vicinity of a dashboard provided with a touch panel. As illustrated in FIG. 2, the display 10 is a display on a front portion of the dashboard (center display), and is arranged between the driver's seat and the passenger seat. The display 10 is provided at a position where it can be touched by a passenger sitting in the driver's seat (hereinafter also referred to as "driver") and a passenger sitting in the passenger seat (hereinafter also referred to as "passenger seat passenger"). As will be described later, the air conditioner 20 is able to blow air independently to the driver and front passenger, and by arranging the display 10 at a position where the driver and front passenger can touch it, the driver and front passenger can independently control air conditioning in their seat space. Note that in the following description, the air conditioner 20 refers to a device that adjusts the temperature of the seat space and a device that prevents glass from fogging, and corresponds to a so-called air conditioner. In addition, the display 10 does not necessarily need to be arranged in a position where both the driver and the passenger in the passenger seat can touch it, and may be arranged in a position where only the driver can touch it, for example. Moreover, the display 10 is not limited to being arranged on the dashboard, and may be arranged at a position that is touched by a passenger in a rear seat, for example.

The passenger selects an operation of the air conditioner 20 from a menu screen by a touch operation of touching the display 10 with a finger or an operating device instead of the finger, and displaying a screen for operating the air conditioner 20. Note that in the following description, a touch operation using a finger will mainly be described; however, in this embodiment, a touch operation using an operating device instead of a finger may be used. The passenger touches the display screen of the display 10 to operate the air conditioner 20. A touch operation is a pointing operation performed by a gesture using a finger, such as touching an icon or button displayed on the display 10 or bringing a finger close to an icon or button. Touch operations include a tap (touch the screen once), a double tap (touch the screen twice), a long tap (touch the screen for a long time), a swipe (slide the finger over the screen while touching the screen (tracing with the finger)), a flick (moving fingers on the screen in a quick flicking motion), a pinch-in/pinch-out (touching the screen with two fingers and moving the fingers closer together or farther away), and the like. The touch operation is not limited to a first gesture of touching one or more points on the screen with a finger, but may also include a second gesture of moving a contact point of the finger while touching the screen. Further, in the touch operation, the finger does not need to directly touch the display screen, and may be so-called hovering, in which a finger or the like is brought close to the display screen. Note that the touch operation method is not limited to these, and other methods may be used. Note that the following description will mainly describe an embodiment using touch operations when directly touching the display screen with a finger, or the like, but in the case of hovering, the following explanation regarding "finger contact" may be replaced with hovering.

The air conditioner 20 is a device that adjusts the temperature inside the vehicle, and is an air conditioner. The air conditioner 20 is composed of an air conditioner system including a compressor and the like, and has an air outlet for blowing air into the passenger seat space, a defroster for removing fog from a windshield and/or side glass, and the like. The air outlet is provided on the dashboard or a portion under the dashboard. The air outlet on the dashboard is a front air outlet, and is arranged to blow air toward the front of the seat. The air outlet at a portion under the dashboard is a lower air outlet, and is arranged to blow air toward the bottom of the seat. A direction of the air changes depending on a direction of fins inside the air outlet. The defroster has an air outlet that blows air from a front portion of the dashboard along the windshield, and outputs the air generated by the air conditioner system.

The controller 30 is composed of a computer equipped with hardware and software, and includes a memory that stores a program, a CPU that executes the program stored in this memory, and the like. The controller 30 has a display control unit 31 and an air conditioning control unit 32 as functional blocks, and a program for achieving the functions of the display control unit 31 and the air conditioning control unit 32 is stored in a memory. The computer included in the controller 30 executes the program to achieve the functions of the functional blocks. In addition, the controller 30 is connected to the display 10 and the air conditioner 20 via a CAN communication network or the like, and in addition to the display 10, controls the air conditioner 20 as a control target. The controller 30 includes not only the display control unit 31 and the air conditioning control unit 32, but also includes a control block for controlling various systems in the vehicle interior, such as a function to control the audio system, and controls not only the display 10 and the air conditioner 20 but also other in-vehicle devices. Note that various systems included in the vehicle are controlled by a plurality of ECUs, and in FIG. 1, the plurality of ECUs are illustrated as the controller 30. It should also be noted that a device including the controller 30 corresponds to the "air conditioning control device" of the present invention.

The display control unit 31 controls the display screen of the display 10. In addition, in a case where a touch operation is detected on the display, the display control unit 31 receives an operation command according to the position of the touch operation on the display screen and the type of the touch operation. The display control unit 31 generates an image representing the operating state of the air conditioner 20 on the display screen, and outputs the image to the display 10. The operating state of the air conditioner 20 is displayed so that the passenger can identify the operating state according to the changing shape, color, pattern, animation, or the like of images included in the display screen. Moreover, the display control unit 31 outputs the received operation command to the air conditioning control unit 32.

The air conditioning control unit 32 controls the air conditioner 20 based on touch operations. The air conditioning control unit 32 identifies control items from the content of the touch operation, and depending on the identified control items performs control such as turning ON/OFF the system, selecting the air outlet, and controlling the airflow, temperature, air direction, and the like of the air blown from the air outlet. The air conditioning control unit 32 outputs control commands according to control items to the air conditioner 20. The control items are determined in advance according to the specifications of the air conditioner, such as airflow setting, air direction setting, temperature setting, and selection of the air outlet. Control items are selected by touch operations on the display 10 or by switches provided in the vehicle. In addition, the air conditioning control unit 32 manages the operating state of the air conditioner 20 and the environment inside the vehicle. The environment inside the vehicle is managed by using temperature sensors and the like.

The control of the air conditioner 20 by the air conditioning control unit 32 and the control of the display screen by the display control unit 31 are linked by an application (software). The display control unit 31 receives an operation command via a touch operation on the display screen, and the air conditioning control unit 32 specifies a control item according to the operation command and outputs a control command according to the control item to the air conditioner 20. In addition, in a case where the air conditioner 20 is controlled by automatic setting and the operation of the air conditioner 20 is changed according to the temperature environment inside the vehicle, the air conditioning control unit 32 transmits a signal indicating the changed operating state to the display control unit 31. The display control unit 31 displays the current operating state of the air conditioner

20 on the display 10 based on the signal received from the air conditioning control unit 32. Thus, the passenger can operate the air conditioner 20 by using the display 10 and check the operating state of the air conditioner 20 from the display screen of the display 10.

Figure 3:
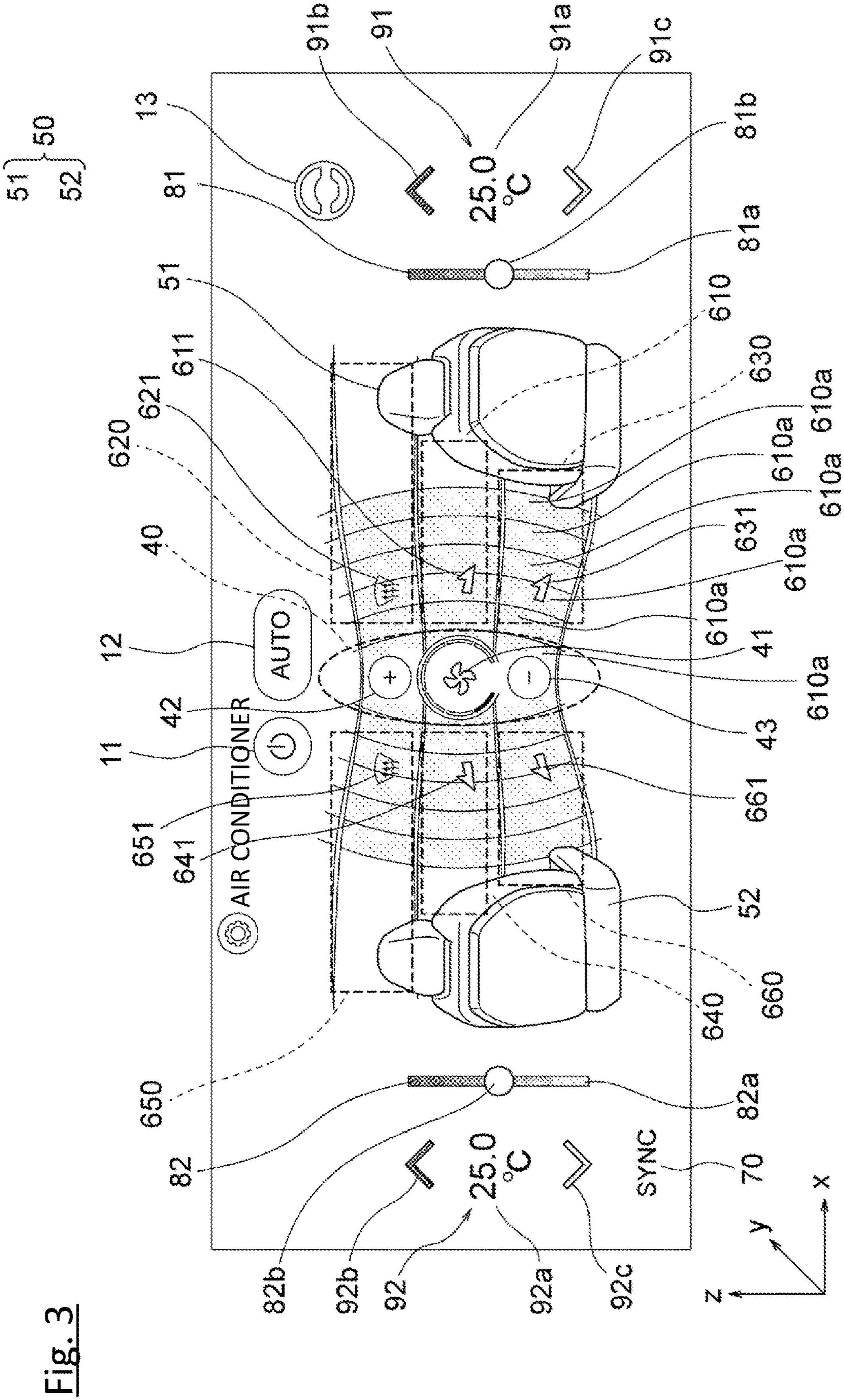
FIG. 3 is a diagram illustrating a display screen of the display in FIG. 1.
Figure 4:
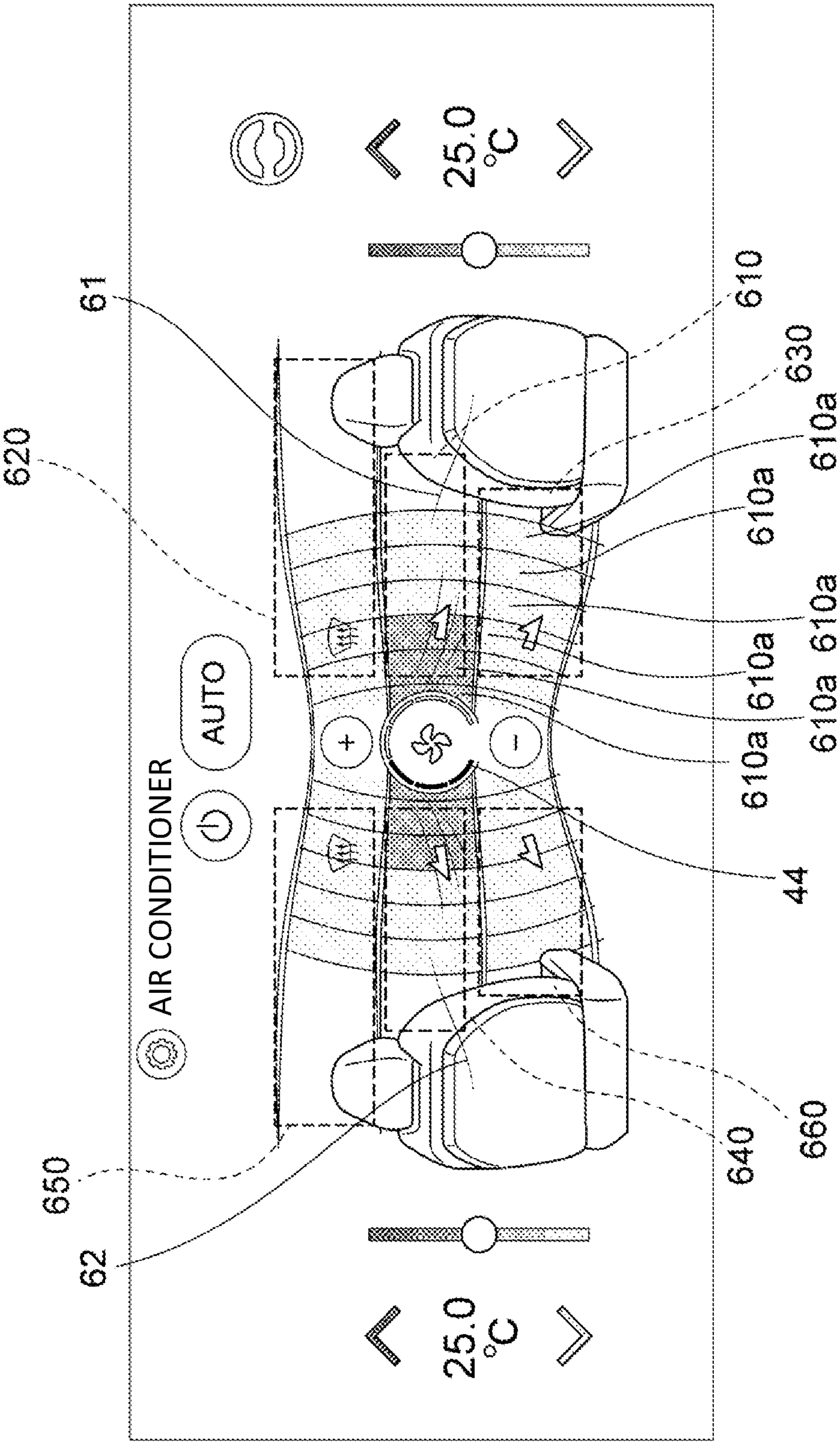
FIG. 4 is a diagram illustrating a display screen of the display in FIG. 1.
Figure 5:
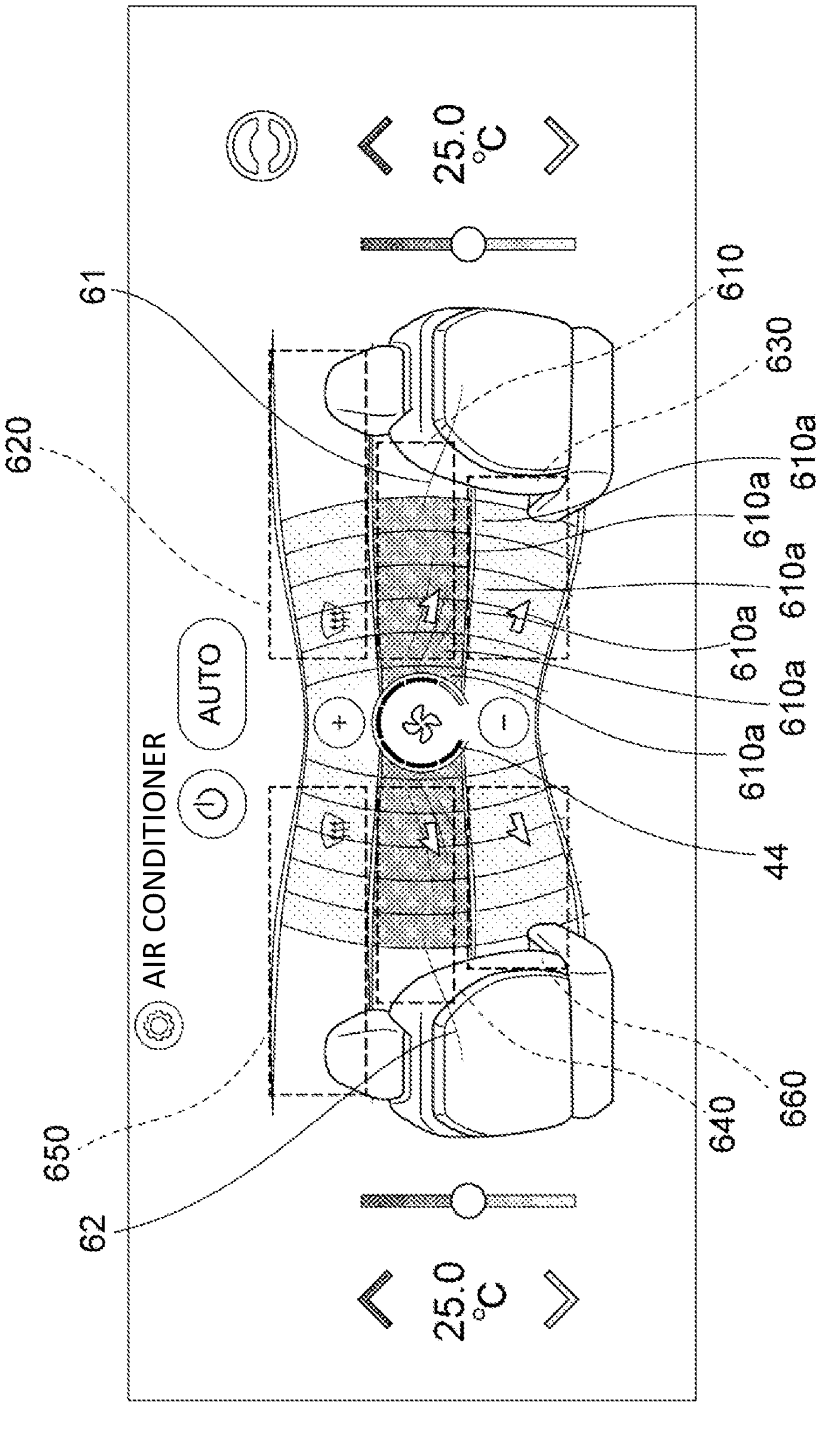
FIG. 5 is a diagram illustrating a display screen of the display in FIG. 1.

Next, a method of controlling the air conditioner 20 using the display 10 and a display screen of the display 10 will be described with reference to FIGS. 3 to 5. FIGS. 3 to 5 illustrate display screens of the display 10, which are operation screens for controlling the air conditioner 20. Note that the control method described below is effective in a case where the display screen of the display 10 is displaying the operation screen of the air conditioner 20. The display screen of the display 10 is a horizontally elongated display. Moreover, the display screens illustrated in FIGS. 3 to 5 are displayed when operating the air conditioner 20 at the front of the vehicle. In FIGS. 3 to 5, the x-axis represents the vehicle width direction (left-right direction), the y-axis represents the depth in the vehicle's traveling direction (forward direction), and the z-axis represents the height direction (up-down direction).

When the passenger turns on a main switch of the display 10, the display control unit 31 displays a top screen on the display 10. From the menu display on the top screen, the passenger touches "air conditioner" as an operation target, and the display 10 detects the touch operation. The controller 30 starts an application for operating the air conditioner 20. Note that the application for controlling the air conditioner 20 may be activated before selecting the "air conditioner (air conditioner)". The display control unit 31 outputs control commands to the display 10 in order to display the display screens illustrated in FIGS. 3 to 5 on the display 10. Note that when operating the air conditioner 20, the initial display screen of the display 10 may display the items that were set the previous time. For example, the airflow, air direction, temperature, and the like when the air conditioner 20 finished operating the previous time are displayed on the current initial display screen. Alternatively, in a case where the operation of the air conditioner 20 is determined by the initial settings, the operation contents of the initial settings are displayed on the current initial display screen. The initial settings may be changeable by the passenger or may be changed on the system side.

As illustrated in FIG. 3, the display screen of the display 10 includes a main switch button 11, a mode switch button 12, a steering wheel icon 13, a reference area image 40, a seat image 50, a synchronization switch button 70, temperature adjustment bars 81 and 82, and temperature display images 91 and 92. The main switch button 11 is a button for switching the air conditioner 20 ON and OFF by a touch operation. The button display will be outlined in white in the OFF state, and the outlined area will be orange in the ON state. Note that in the following description, the ON/OFF display of other button icons is similarly represented by a white outline display and an orange outline display. The mode switch button 12 is a switch for switching the operation mode (AUTO, MANUAL) of the air conditioner 20. The steering wheel icon 13 is located on the right side of the display screen, and indicates that the seat on the right side of the display screen is the driver's seat. Note that the icons and buttons displayed on the display screen, depending on the types thereof, define areas in which touch operations are enabled in order to control the air conditioner 20. Therefore, the user is able to operate the air conditioner 20 by touching the icons or buttons.

The reference area image 40 is an image within a predetermined range with a center point of the display screen as a center of the area, and includes at least a fan icon 41. The fan icon 41 is represented in a center portion of the display screen by a figure imitating an air outlet (fan). In other words, the fan icon 41 is an icon that imitates the air conditioner 20 that is the control target. The display screen of the display 10 includes a reference area image 40 representing a reference area and a seat image 50 representing a seat. The reference area is an area set for determining a direction for performing a touch operation (hereinafter also referred to as a directional touch operation) having a certain direction (vector), such as a tap, swipe, or flick. In other words, in a case of performing a directional touch operation on the display screen for adjusting the airflow or the like as described later, the reference area is provided to indicate, on the display screen, the position where a finger touches in a directional touch operation or the direction in which the finger moves. Note that the directional touch operation, in other words, may be a touch operation in which the movement of a contact point such as a finger accompanying the touch operation has a vector. In the examples illustrated in FIGS. 3 to 5, the reference area is a vertically elongated area in the up-down direction (the area surrounded by a dotted ellipse) centering on the fan icon (fan FIG. 41. Note that the reference area is defined as a closed space such as a rectangle, circle, or ellipse. The reference area image does not necessarily need to be an image that allows the passenger to recognize the boundary of the reference area, and it is sufficient that the image includes at least the fan icon 41. In other words, a reference area may be set on the display screen so that the passenger can specify the direction in which to move his or her finger and/or the position to first touch the finger when operating the screen using a directional touch operation.

The seat image 50 is drawn as the seat looks when viewed from the rear. The seat image 50 includes a right seat image 51 and a left seat image 52. In a case where the traveling direction (forward direction) of the vehicle is the front, the right seat image 51 represents the right seat (driver's seat), and the left seat image 52 represents the left seat (passenger seat). The seat image 50 corresponds to an icon indicating a position of the user. For example, the right seat image 51 illustrates the position of the driver. The reference area image 40 is located between the right seat image 51 and the left seat image 52 on the display screen. The right seat image 51 and the left seat image 52 are displayed on the display screen at an arrangement when the right seat and the left seat are viewed from the rear. The left and right seat images 51 and 52 and the fan icon 41 are displayed in a front-rear positional relationship in the y-axis direction so as to have depth on the display screen. In addition, by rotating the right seat a predetermined angle (for example, within a range of 10 to 45 degrees) counterclockwise around the z-axis from the front surface, and rotating the left seat by a predetermined angle (for example, within a range of 10 to 45 degrees) clockwise around the z-axis from the front surface, the left and right seat images 51 and 52 are displayed so that both seats face the fan icon 41 in front. That is, the reference area image 40 and the left and right seat images 51 and 52 are arranged so that the left and right seats face the reference area on the display screen. Thus, the passenger looking at the display screen can visually grasp from the display 10 that the left and right seats are facing the fan icon 41 in front.

The positional relationship between the reference area image 40 and the seat image 50 in the z-axis direction will be explained. The right seat image 51 and the left seat image 52 are displayed on the display screen at the same height in the z-axis direction. The fan icon 41 is displayed on the display screen so as to be at the same height in the z-axis direction as the chest portions of the left and right seat images 51 and 52. As will be described later, an image (icon) indicating the air of the air conditioner 20 is displayed between the reference area image 40 and the seat image 50. The reference area and the height of the seat image are defined so that the area between the fan icon 41 and the chest portion of the seat image 50 can be divided into an upper area and a lower area for this area on the display screen.

Next, the display of the air coming out from the air conditioner 20 will be explained. As illustrated in FIGS. 4 and 5, a right side air image 61 is displayed between the reference area image 40 and the right seat image 51, and a left side air image 62 is displayed between the reference area image 40 and the left seat image 52. The right side air image 61 is an image of the air blown from the air conditioner 20 toward the right seat, and the left side air image 62 is an image of the air blown from the air conditioner 20 toward the left seat. The right side air image 61 is displayed in touch areas 610 to 630, which will be described later, and the left side air image 62 is displayed in touch areas 640 to 660, which will be described later. The right side air image 61 and the left side air image 62 are not displayed in a case where the airflow level is "0", but are displayed when the airflow level is higher than "0". The right side air image 61 and the left side air image 62 indicate whether or not the air is blowing, and it becomes easier for the passenger to understand whether the air is blowing by checking whether the right side air image 61 and the left side air image 62 are displayed.

The reference area image 40 includes a "+" icon 42 and a "−" icon 43 in addition to the fan icon 41 described above. The "+" icon 42 is a button for increasing the airflow, and the "−" icon 43 is a button for decreasing the airflow. When the passenger touches the "+" icon 42 one time on the display screen, the airflow increases by one step, and when the passenger touches the "−" icon 43 one time, the airflow decreases by one step. The airflow level increases or decreases according to the number of touches. Furthermore, when the "+" icon 42 is touched with a long tap, the airflow level becomes the maximum value, and when the "−" icon 43 is touched with a long tap, the airflow level becomes zero or a minimum value (greater than 0).

An area between the reference area image 40 and the right seat image 51 is divided into a touch area 610 between the fan icon 41 and the chest portion of the right seat image 51, a touch area 620 between the "+" icon 42 and a head portion of the right seat image 51, and a touch area 630 between the "−" icon 43 and a lower portion (seat surface portion) of the right seat image 51. The touch area 610 is an area for controlling the air that comes out from the front air outlet toward the right seat, the touch area 620 is an area for controlling the defroster, and the touch area 630 is an area for controlling the air flowing out from the lower air outlet toward the lower portion of the right seat. That is, the control target of the air conditioner 20 changes depending on the position of the touch operation. For example, in a case where the passenger adjusts the airflow of the air coming out from the front air outlet toward the right seat, the passenger can touch the touch area 610. Note that the specific operating method for adjusting the airflow will be described later. An area between the reference area image 40 and the left seat image 52 is similarly divided into touch areas 640, 650, and 660. The touch area 640 is an area for controlling the air that comes out from the front air outlet toward the left seat, the touch area 650 is an area for controlling the defroster, and the touch area 660 is an area for controlling the air flowing out from the lower air outlet toward the lower portion of the left seat. On the display screen, the touch areas 610 and 640 are adjacent to the fan icon 41, the touch areas 620 and 650 are adjacent to the "+" icon 42, and the touch areas 630 and 660 are adjacent to the "−" icon 43.

An air icon 611 representing the air toward the front of the right seat, a defroster icon 621 representing the defroster, and an air icon 631 representing the air toward the lower portion of the right seat surface are displayed on the display screen of the display 10. On the display screen of the display 10, the air icon 611 is displayed between the fan icon 41 and the chest portion of the right seat image 51, the defroster icon 621 is displayed between the "+" icon 42 and the head portion of the right seat image 51, and the air icon 631 is displayed between the "−" icon 43 and the lower portion (seat surface portion) of the right seat image 51.

The air icons 611 and 631 are represented by arrows, and the arrows point from the reference area image 40 to the right seat image 51.

An air icon 641 representing the air toward the front of the left seat, a defroster icon 651 representing the defroster, and an air icon 661 representing the air toward the lower portion of the left seat surface are displayed on the display screen of the display 10. On the display screen of the display 10, the air icon 641 is displayed between the fan icon 41 and the chest portion of the left seat image 52, the defroster icon 651 is displayed between the "+" icon 42 and the head portion of the left seat image 52, and the air icon 661 is displayed between the "−" icon 43 and the lower portion (seat surface portion) of the left seat image 52. The air icons 641 and 661 are represented by arrows, and the arrows point from the reference area image 40 to the left seat image 52.

The air icons 611, 631, 641, and 661 are displayed in the touch areas 610, 630, 640, and 660, respectively, to visually indicate to the passenger that the air coming out from the air outlet toward the front of the seat and the lower portion of the seat can be adjusted by touch operations on the touch areas 610, 630, 640, and 660. In addition, the defroster icons 621 and 651 are displayed in the touch areas 620 and 650, respectively, to visually indicate to the passenger that the defroster can be adjusted by a touch operation in the touch areas 620 and 650. Further, the directions of the air icons 611, 631, 641, and 661 indicate the operation direction of the directional touch operation when increasing the airflow.

Next, the operation method for adjusting the airflow and the display form of the airflow will be described. The touch areas 610 to 660 represent areas where touch operations for operating the air conditioner 20 are enabled independently for each area. In other words, the touch area 610 represents an area where a touch operation for adjusting the air coming out from the front air outlet to the right side passenger is enabled. The touch areas 620 and 650 represent areas where touch operations for controlling the defroster are enabled. The touch area 630 represents an area where a touch operation for adjusting the air coming out from the lower air outlet to the right side passenger is enabled. The touch areas 640 and 660, similar to the touch areas 610 and 630, represent areas that enable a touch operation for adjusting the air coming out from the air outlet to the left side passenger.

A desired control target may be selected from among the touch areas 610 to 660 by performing a touch operation on an area corresponding to the control target desired to be controlled. The control target corresponds to a device in the entire air conditioner 20 that outputs air. For example, in a case where the passenger wants to adjust the air coming out from the front air outlet toward the right seat, the passenger touches the touch area 610. Note that the touch operation for selecting the control target does not need to be a directional touch operation, and may be a touch operation that does not have directionality (a fixed direction (vector)), such as a tap. Depending on the direction of the directional touch operation within the touch area, it is possible to switch between a strong and weak airflow. In a case where the directional touch operation has a direction from the reference area image 40 toward the seat image 50, the airflow of the air coming out from the air conditioner 20 increases. On the other hand, in a case where the directional touch operation has a direction from the seat image 50 toward the reference area image 40, the airflow of the air coming out from the air conditioner 20 decreases. For example, in a case where the passenger on the right side wants to increase the airflow of the air coming out from the front air outlet, the passenger touches the inside of the touch area 610 and moves the finger in a direction from the fan icon 41 toward the right seat image 51 while touching the area. In addition, for example, in a case where the passenger on the left side wants to decrease the airflow of the air coming out from the lower air outlet, the passenger touches inside the touch area 660 and moves the finger in a direction from the left seat image 52 toward the "–" icon 43 while touching the area.

As described above, the control target of the air conditioner 20 is selected by touching one of the plurality of touch areas 610 to 660. Then, in a case where the touch operation has a direction from the reference area image 40 toward the seat image 50 on the display screen, the air conditioning control unit 32 outputs to the air conditioner 20 a control signal that increases the airflow of the air coming out from the air conditioner 20. In addition, when the touch operation has a direction from the seat image 50 to the reference area image 40 on the display screen, the air conditioning control unit 32 outputs a control signal to the air conditioner 20 to decrease the airflow of the air coming out from the air conditioner 20. In this way, the selection of the control target and the adjustment of the output from the control target are performed by touch operations, and the touch operations include the first gesture and the second gesture. Examples of the first gesture and the second gesture include a combination of a tap and a swipe, only a swipe or a flick, two swipes or two flicks, or a combination of a swipe and a flick. The first gesture indicates a finger movement that includes at least contact between the finger and the display screen. The second gesture indicates a finger movement in a certain direction. For example, in a touch operation that combines a tap and a swipe, the first tap corresponds to the first gesture, and the second swipe corresponds to the second gesture. That is, in a combination of two touch operations, the first gesture is an operation of touching one point on the display screen, such as touching or hovering. The second gesture is an operation such as a swipe or a flick that moves a point of contact with a finger on the display screen in a certain direction. In addition, as an example of a single touch operation, in a case of only a swipe or flick, the movement of touching the display screen with the finger for swiping or flicking corresponds to the first gesture, and the action of moving the finger after making contact with the finger (the action of sliding the finger for a swipe, the action of snapping the finger for a flick) corresponds to the second gesture. Moreover, another example of performing a touch operation twice is to swipe or flick twice each, or in the case of a combination of a swipe and flick, the first swipe or flick corresponds to the first gesture, and the second swipe or a flick corresponds to the second gesture. Note that the first and second gestures are not limited to a touch, swipe, and flick, and may be finger movements in other touch operations such as a long tap.

The display 10 detects a first gesture and a second gesture from touch operations in a plurality of touch areas 610 to 660. In a case where the display 10 detects the first gesture in the touch areas 610 to 660, the air conditioning control unit 32 selects the control target corresponding to the detected touch areas 610 to 660. For example, in a case where the display 10 detects the first gesture in the touch area 610, the air conditioning control unit 32 selects, from among the air conditioners 20, a device for blowing air out from the front air outlet to the right seat as a control target. In a case where the display 10 detects the second gesture in the touch areas 610 to 660, the air conditioning control unit 32 increases the control amount of the selected air conditioner 20 when the second gesture is in a direction away from the fan icon 41. On the other hand, in a case where the display 10 detects the second gesture in the touch areas 610 to 660 and when the second gesture has a direction approaching the fan icon 41, the air conditioning control unit 32 decreases the control amount of the selected air conditioner 20. The control amount is the airflow. This makes it possible to adjust the airflow with a touch operation. Note that the control amount is not limited to the airflow, and may be, for example, the air speed, temperature, or the like.

Furthermore, the air conditioning control unit 32 may adjust the increase or decrease of the air according to the operation amount and/or operation speed of the directional touch operation within the touch areas 610 to 660. That is, the air conditioning control unit 32 increases the increase or decrease of the air coming out from the air conditioner 20 the larger the operation amount of the directional touch operation (corresponding to the moving distance of the finger in contact with the swipe) becomes. In addition, the air conditioning control unit 32 increases the increase or decrease of the air coming out from the air conditioner 20 the larger the operation speed (corresponds to the moving speed of the touching finger in a swipe, or corresponds to the moving speed of the finger when flicking the finger) of the directional touch operation becomes.

Moreover, the air conditioning control unit 32 may select a control target in the air conditioning control unit 32 and/or adjust the increase or decrease of the air according to touch operations within the touch areas 610 to 660. For example, in a case where the touch area 610 of the touch areas 610 to 660 is touched with a finger, the air conditioning control unit 32 selects the air conditioner 20 of the portion that outputs air from the front air outlet toward the right seat as a control target, and controls the output of the air from the front air outlet toward the right seat. The air conditioning control unit 32 may increase the airflow level according to the number of touch operations. In a case where the touch operation is performed two times, the air conditioning control unit 32 may increase the airflow level by two levels. In this way, in a case where the touch areas 610 and 640 are touched, the air conditioning control unit 32 outputs a control command to control the output of the air coming out from the front air outlet, in a case where the touch areas 620 and 650 are touched, the air conditioning control unit 32 outputs a control command to control the defroster, and in a case where the touch areas 630 and 660 are touched, the air conditioning control unit 32 outputs a control command to control the output of the air from the lower air outlet.

The airflow of the air coming out from the defroster, the front air outlet, and the lower air outlet is indicated by a scale display in the touch areas 610 to 660. Touch areas 610 to 660 include scales representing the magnitude of airflow. The display screen in FIG. 3 illustrates a state in which each of the airflow from the defroster, the front air outlet, and the lower air outlet is zero. The display screen in FIG. 4 illustrates a state in which air at an airflow level of "3" is coming out from the front air outlet toward the right seat and the left seat, and no air is coming out from the defroster and the lower air outlet. The display screen in FIG. 5 illustrates a state in which air at an airflow level of "6" is coming out from the front air outlet toward the right seat and the left seat, and no air is coming out from the defroster and the lower air outlet.

On the display screen in FIG. 3, no air is coming out from the defroster, front air outlet, or lower air outlet, and the air images 61 and 62 are not displayed on the display screen. In the display screens of FIGS. 4 and 5, the air images 61 and 62 are displayed in the areas 610 and 640 because air is coming out from the front air outlet toward the left and right seats. In addition, in the display screens of FIGS. 4 and 5, no air is coming out from the defroster and the lower air outlet, and thus the air images 61 and 62 are not displayed in the areas 620, 630, 650, and 660. In this way, the air images 61 and 62 are displayed for each of the touch areas 610 and 640. This makes it easier to understand which air outlet the air is coming out from, which seat on the left or right the air is directed toward, and which air outlet the air is not coming out from. Note that the length and number of the air images 61 and 62 may be changed depending on the airflow level. For example, the larger the airflow level is, the longer the air images 61 and 62 may be. Furthermore, the higher the airflow level is, the more air images 61 and 62 may be displayed. In a case where the airflow level differs for each touch area 610 to 660, the length and number of air images 61 and 62 may differ for each area depending on the level. Note that the air images 61 and 62 may be displayed even in a case where there is no air coming out as in the example in FIG. 3.

Within the touch areas 610 to 660, six scales may be displayed to display seven airflow levels from "0" to "6". The six scales are expressed in a wave pattern extending from the reference area toward the left and right seats, and the number of displayed airflow images 610*a* represents the airflow level. In a case where the airflow level is zero, all of the airflow images 610*a* are displayed in white. In a case where the airflow level is greater than 0, the airflow image 610*a* is displayed in a color other than white depending on the size of the airflow level. The number of airflow images 610*a* represents the wave pattern and the airflow level, and one airflow image 610*a* represents one scale. In addition, the number of airflow images 610*a* can be changed for each touch area 610 to 660. Note that, in FIGS. 3 to 5, due to the color of the paper, the airflow image 610*a* is not displayed in white but has a dot pattern: however, the background of the display screen may be black and the airflow image 610*a* may be filled with white. Moreover, a pattern is formed by lining up a plurality of airflow images 610*a*. When the airflow level is zero, all of the airflow images 610*a* within the touch areas 610 to 660 are displayed in white. As illustrated in FIG. 4, in a case where air having an airflow level of "3" is coming out from the front air outlet toward the left and right seats, three airflow images 610*a* are displayed in a color other than white in the areas 610 and 640, thereby representing three patterns. In the areas 610 and 640, the airflow images 610*a* corresponding to the scale of airflow levels "4 to 6" remain displayed in white. In addition, as illustrated in FIG. 4, since no air is coming out from the defroster and the lower air outlet, all of the airflow images 610*a* in the touch areas 620, 630, 650, and 660 are displayed in white. In a case where the airflow level of the air coming out from the front air outlet toward the left and right seats is changed from 3 to 6, the display screen changes from the display form illustrated in FIG. 4 to the display form illustrated in FIG. 5, and the number of patterns displayed within the touch areas 610 and 640 increases from three to six. The display order of the plurality of airflow images 610*a* corresponds to the air direction, and the airflow images 610*a* are displayed from the side closest to the reference area. In other words, the display screen of the display 10 includes the airflow image 610*a* represented by a pattern between the reference area image 40 and the seat image 50, and the number of patterns displayed from the reference area image 40 toward the seat image 50 increases as the airflow increases. This makes it possible for the passenger to visually grasp the airflow level from the number of patterns and the length of the patterns. In this way, in the present embodiment, the airflow image 610*a* is displayed in white when no air is coming out from the air outlet, and, depending on the airflow level, the airflow image 610*a* is displayed in a color other than white when air is coming out from the air outlet. As a result, the scale can be seen, and thus it easier to understand whether or not air is blowing, and when air is blowing, the size of the airflow level. Note that the pattern formed in the airflow image 610*a* is not limited to a wave pattern, and may be another pattern such as a gradation pattern or a striped pattern.

In the present embodiment, an airflow image 610*a* is displayed for each of the touch areas 610 to 660, depending on the airflow level of the air coming out from each air outlet. That is, in the examples of FIGS. 4 and 5, in the touch areas 610 and 640, a number of scales corresponding to the airflow level are displayed in the airflow image 610*a* having a color other than white. Furthermore, in the touch areas 620, 630, 650, and 660, all scales in the airflow image 610*a* are white. Thus, the passenger is able to know from the display screen that air is coming out from the front air outlet toward the left and right seats, and is able to know the airflow level. In addition, the passenger is also able to know that no air is coming out from the defroster or the lower air outlet. In other words, it becomes easier for the passenger to know which air outlets the air is coming out from, whether the air is blowing toward, the left or right seat, and which air outlets the air is not coming out from. It also makes it easier to know the airflow level for each area.

Note that in the present embodiment, the display of the air images 61 and 62 and the airflow image 610*a* is controlled for each of the touch areas 610 to 660, but does not need to be controlled for each of the areas 610 to 660. For example, in a case where air having an airflow level of "3" is coming out from the front air outlet toward the right seat, but no air is coming out from the defroster or the lower air outlet, the air image 61 is displayed in the areas 610 to 630, and three airflow images 610*a* may be displayed in the areas 610 to 630 in a color other than white.

Note that the directional touch operation for adjusting the airflow may be performed at any position in the touch areas 610 to 660. In other words, in a case where the positional coordinates of the touch position when the display screen is touched move relatively within the touch areas 610 to 660, that is, in a case where the touch position can be confirmed at an arbitrary position within the touch areas 610 to 660, the directional touch operation is detected as an operation for adjusting the airflow. For example, in a case where the passenger on the right side wants to increase or decrease the airflow of the air coming out from the front air outlet, the passenger may touch a portion within the touch area 610 close to the fan icon 41 or a portion close to the right seat image 51. Then, the passenger only has to change the operating direction of the directional touch operation according to the increase or decrease in the airflow. In addition, the passenger may change the operation amount and/or operation speed of the directional touch operation depending on the increase or decrease of the air. This makes it possible for the passenger to touch any portion of the touch areas 610 to 660 in order to adjust the airflow.

Moreover, adjustment of the airflow by the directional touch operation may be changed depending on the position of the touch within the touch areas 610 to 660. In other words, in a case where a directional touch operation is performed within the touch areas 610 to 660, the airflow increases or decreases up to the scale matching the position of the end point of the touch operation. For example, in the example of FIG. 4, in a case where the passenger performs a directional touch operation within the touch area 610 and the touch position moves from the first scale to the third scale, the air conditioning control unit 32 sets the airflow level of the air from the front air outlet to 3. Thus, the airflow level can be changed according to the touch position in the touch areas 610 to 660.

Next, the synchronization switch button 70 will be described. The synchronization switch button 70 is a switch for synchronously adjusting the right seat airflow from the air conditioner 20 toward the right seat and the left seat air flowing from the air conditioner 20 toward the left seat. In a case where the synchronization switch button 70 is ON, the passenger can adjust the air output for both the right seat air and the left seat air by touching the touch areas 610 to 660. In a case where the synchronization switch button 70 is OFF, the passenger is not able to adjust the air output for both the right seat air and the left seat air even when the touch areas 610 to 660 are touched, and is able to adjust the air output corresponding to the touched area. For example, in a case where a directional touch operation is performed from the reference area image 40 toward the right seat image 51 within the touch area 610 while the synchronization switch button 70 is ON, in addition to the air that is output from the front air outlet toward the right seat, the air that comes out from the front air outlet toward the left seat is adjusted according to the directional touch operation. The air direction and airflow level are also adjusted synchronously for the left and right air. Further, for example, in a case where the passenger touches the touch area 660 while air is not being output from the lower air outlet toward the left and right seats and the synchronization switch button 70 is ON, the air coming out from the lower air outlet toward the left seat and the air coming out from the front air outlet toward the left seat may be output in synchronization. That is, in a case where the synchronization switch button 70 is ON, the air conditioning control unit 32 outputs a control command to the air conditioner 20 to control the output of both the right seat air and the left seat air in response to a touch operation. Furthermore, in a case where the synchronization switch button 70 is OFF, the air conditioning control unit 32 outputs a control command to the air conditioner 20 to control the output of either the right seat air or the left seat air in response to a touch operation. Thus, the passenger is able to adjust the air from the air conditioner 20 toward both the left and right seats by touching either the left or right area with respect to the reference area on the display screen. Note that in the present embodiment, although the airflow of the air flowing toward the left and right seats is synchronously controlled in accordance with the ON/OFF switching of the synchronization switch button 70, control is not limited to the airflow, but the direction and temperature of the air may also be synchronously controlled. In other words, in a case where the synchronization switch button 70 is ON, the air conditioning control unit 32 issues a control command to the air conditioner 20 to synchronously control the airflow of the air of both the right seat air and the left seat air in response to a touch operation, or outputs a control command to the air conditioner 20 to synchronously control the air temperature of both the right seat air and the left seat air.

Next, images around the fan icon 41 and animation of the fan icon 41 will be described. The reference area image 40 includes, around the fan icon 41, a plurality of scales 44 surrounding the fan icon 41. The plurality of scales 44 are arranged in a ring shape around the fan icon 41, and gaps are provided between the plurality of scales 44 to distinguish the scales. As the airflow level increases, the number of displayed scales 44 increases in the clockwise direction. In the example in FIG. 4, the airflow level is 3, and thus three scales 44 are displayed. In the example in FIG. 5, the airflow level is 6, and thus six scales 44 are displayed. In other words, the plurality scales 44 increase or decrease depending on the airflow of the air flowing toward the left and right seats. Moreover, the fan icon 41 may have an animation function that rotates according to the air speed and/or airflow coming out from the front air outlet and/or the lower air outlet. In a case where air is not coming out from the front air outlet and the lower air outlet, the fan icon 41 remains stationary. In a case where air comes out from the front air outlet and the lower air outlet, the fan icon 41 rotates. The rotational speed of the fan icon 41 increases as the airflow level and/or air speed increases. Note that the air speed corresponds to the airflow level. Note that regarding the display of a plurality of scales 44, in a case where the airflow of the air flowing toward the left seat and the airflow of the air flowing toward the right seat are different, the number of scales 44 displayed may correspond to a larger airflow, a smaller airflow, or an average airflow.

Next, the temperature adjustment bars 81 and 82 will be described. As illustrated in FIGS. 3 to 5, the temperature adjustment bar 81 is displayed on the right side of the right seat image 51, and the temperature adjustment bar 82 is displayed on the left side of the left seat image 52. The temperature adjustment bars 81 and 82 have images 81*a* and 82*a* of line segments along the z-axis, and buttons 81*b* and 82*b* that can be moved on the line segments. The upper ends of the line segment images 81*a* and 82*a* are displayed in red, and the lower ends of the line segment images 81*a* and 82*a* are displayed in blue. Note that in FIGS. 3 to 5, dots are used instead of colors, and similarly in other FIGS. 6 to 8, dots are used instead of colors. In addition, the line segment images 81*a* and 82*a* are displayed in a gradation that changes from red to blue from the top end to the bottom end. The buttons 81*b* and 82*b* on the line segments can be moved by touch operations such as a tap, a swipe, and/or a flick. In a case where the buttons 81*b* and 82*b* are moved toward the upper end of the line segment by a touch operation, the temperature setting of the air conditioner 20 becomes higher. On the other hand, in a case where the buttons 81*b* and 82*b* are moved toward the lower end of the line segment by a touch operation, the temperature setting of the air conditioner 20 becomes lower. The temperature setting of the air conditioner 20 changes depending on the position of the buttons 81*b* and 82*b* included in the temperature adjustment bars 81 and 82. The temperature adjustment bar 81 is an adjustment icon for adjusting the temperature setting in the space of the right seat. The temperature adjustment bar 82 is an adjustment icon for adjusting the temperature setting in the left seat space. The temperature adjustment bars 81 and 82 can be operated by an upward touch operation and a downward touch operation. In other words, in a case where the temperature adjustment bars 81 and 82 are operated by an upward touch operation, the air conditioning control unit 32 outputs a control command to raise the temperature setting of the air conditioner 20, and in a case where the temperature adjustment bars 81 and 82 are operated by a downward touch operation, the air conditioning control unit 32 outputs a control command to lower the temperature setting of the air conditioner 20. Thus, the passenger is able to easily change the temperature setting of the air conditioner 20 by a touch operation on the display 10. Moreover, the ends of the temperature adjustment bars 81 and 82 are distinguished by red and blue, and thus the passenger is able to easily know from the display screen which direction to perform a touch operation in order to raise or lower the temperature.

Furthermore, in a case where the buttons 81*b* and 82*b* included in the temperature adjustment bars 81 and 82 are operated by a directional touch operation, the unit of change in the temperature setting may be changed depending on the operation speed of the directional touch operation. The unit of change in the temperature setting is preset in multiple stages, and is preset to, for example, 0.5° C. and 1.0° C. Then, in a case where the movement speed of the buttons 81*b* and 82*b* is equal to or less than a predetermined speed threshold, the air conditioning control unit 32 sets the unit of change in the temperature setting (amount of temperature change per unit) to the minimum unit (0.5° C.). In a case where the movement speed of the buttons 81*b* and 82*b* is higher than a predetermined speed threshold, the air conditioning control unit 32 sets the unit of change in the temperature setting (amount of temperature change per unit) to a unit larger than the minimum unit (for example, 1.0° C.). For example, in a case where a passenger operates the buttons 81*b* and 82*b* by swiping, when the movement speed of the buttons 81*b* and 82*b* by swiping is high, the amount of change in the temperature setting will be large compared to the amount of movement of the buttons 81*b* and 82*b* by swiping. On the other hand, when the movement speed of the buttons 81*b* and 82*b* is low in the touch operation by the same swipe, the amount of change in the temperature setting becomes small even when the amount of button movement by the swipe is the same. That is, even when the amount of movement of the buttons 81*b* and 82*b* is the same, the amount of change in the temperature setting changes due to the difference in movement speed. The higher the movement speed of the touch operation, the larger the unit of change in the temperature setting becomes, and therefore the range of change in the temperature setting also becomes larger. Therefore, the unit of change in the temperature setting can be adjusted by the movement speed of the buttons 81*b* and 82*b* by directional touch operation, and thus the temperature can be easily adjusted.

Next, the temperature display images 91 and 92 will be described. As illustrated in FIGS. 3 to 5, the temperature display image 91 is displayed on the right side of the right temperature adjustment bar 81, and the temperature display image 92 is displayed on the left side of the left temperature adjustment bar 82. The temperature display images 91 and 92 have temperature meters 91*a* and 92*a*, up buttons 91*b* and 92*b*, and down buttons 91*c* and 92*c*. The temperature meters 91*a* and 92*a* indicate the current temperature setting. The up buttons 91*b* and 92*b* are buttons for increasing the temperature setting, and the down buttons 91*c* and 92*c* are buttons for decreasing the temperature setting. When the up buttons 91*b* and 92*b* are touched one time, the temperature setting increases by a predetermined change unit (for example, 0.5° C.). In addition, when the down buttons 91*c* and 92*c* are touched one time, the temperature setting is decreased by a predetermined change unit (for example, 0.5° C.). Moreover, the up buttons 91*b* and 92*b* are displayed in red, and the down buttons 91*c* and 92*c* are displayed in blue. Thus, the passenger is able to check the current temperature setting and easily change the temperature setting of the air conditioner 20 by a touch operation on the display 10. Furthermore, the up buttons 91*b* and 92*b* and down buttons 91*c* and 92*c* are distinguished by red and blue, and thus the passenger is able to easily know from the display screen which button to touch to raise or lower the temperature.

Figure 6:
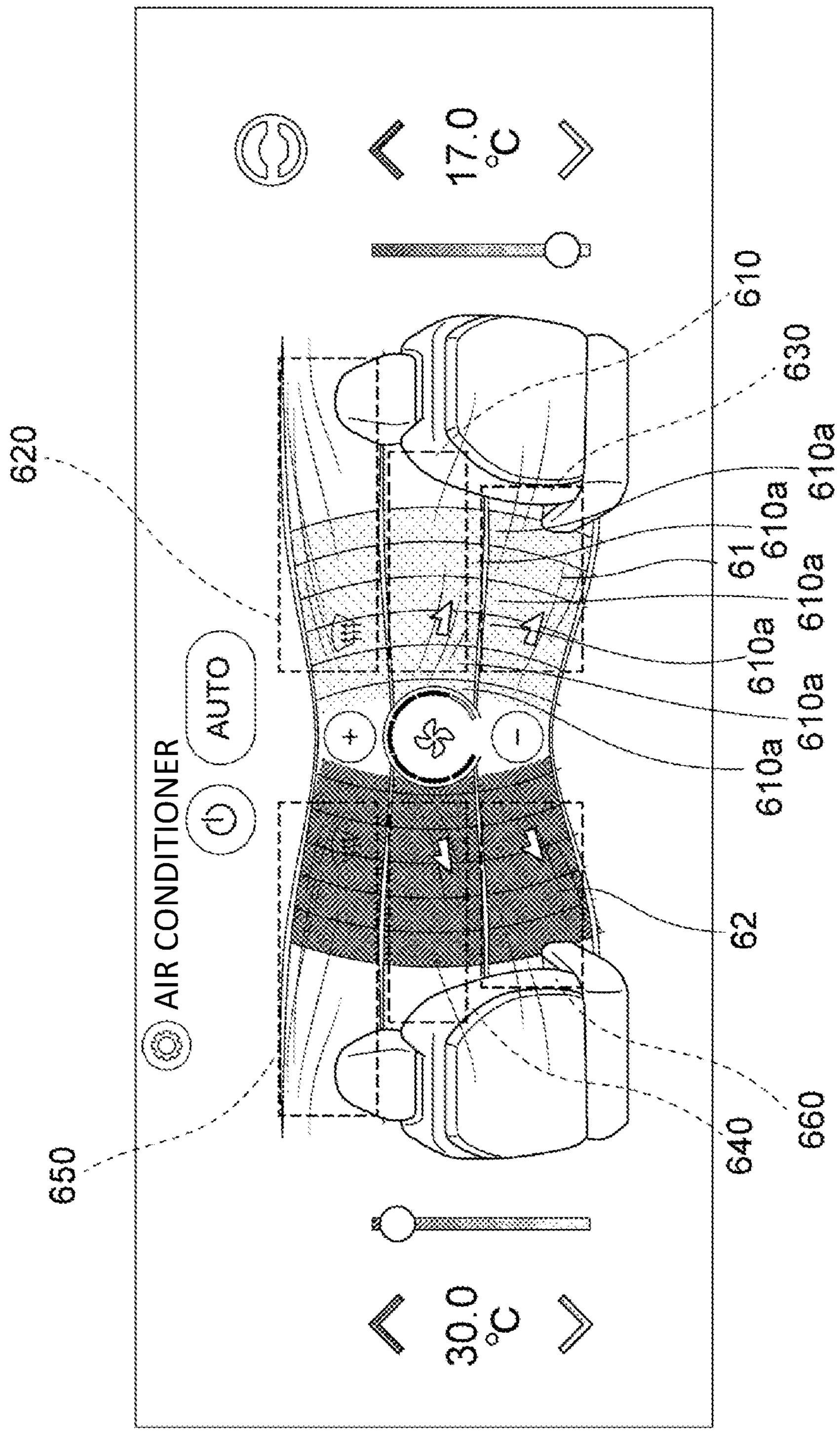
FIG. 6 is a diagram illustrating a display screen of the display in FIG. 1.

Next, the colors of the wave patterns displayed in the touch areas 610 to 660 will be described with reference to FIGS. 6 and 7. The temperature setting of the air conditioner 20 can be set to different temperatures for the right seat and the left seat. For example, in the example illustrated in FIG. 6, air is coming out from the defroster, the front air outlet, and the lower air outlet toward the right seat, the airflow level is set to "6," and the temperature setting is set to 17.0° C. In addition, air is coming out from the defroster, the front air outlet, and the lower air outlet toward the left seat, the airflow level is set to "6," and the temperature setting is set to 30.0° C. In this case, on the display screen of the display 10, between the reference area image and the right seat image, the airflow image 610*a* is displayed in a color representing the temperature setting of 17.0 degrees. Moreover, between the reference area image and the left seat image, the airflow image 610*a* is displayed in a color representing the set temperature of 30.0 degrees. As a result, six wave patterns are displayed to indicate the airflow level "6", and the wave pattern is colored in accordance with the temperature setting. Note that in a case where the airflow level is "3", the airflow image 610*a* is displayed in a color according to the temperature setting on three of the six scales, and in white on the other three scales. This makes it possible to recognize the scale, making it easier to know the strength of the airflow.

Figure 7:
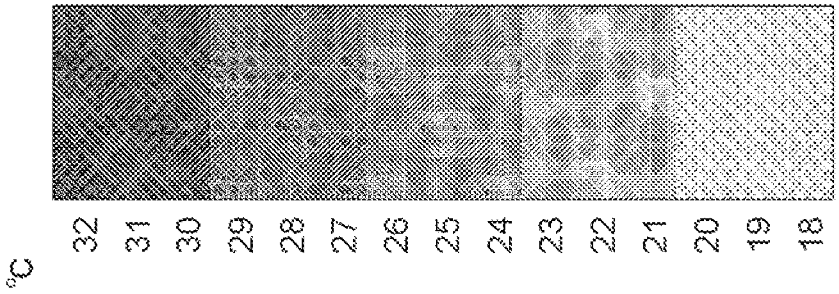
FIG. 7 is a graph illustrating a relationship between the temperature display and temperature setting.

FIG. 7 is a bar graph showing the relationship between the colors displayed in the wave pattern and the temperature, and as shown in the graph in FIG. 7, red is displayed when the temperature setting is high, and blue is displayed when the temperature setting is low. Furthermore, as the temperature setting becomes lower, the color display changes from red to white and from white to blue. In the example in FIG. 7, in a case where the temperature setting is less than 20.5° C., the color display will be blue, in a case where the temperature setting is 20.5° C. or more and less than 23.5° C., the color display will be light blue, in a case where the temperature setting is 23.5° C. or more and less than 26.5° C., the color display will be white, in a case where the temperature setting is 26.5° C. or more and less than 29.5° C., the color display will be pink, and in a case where the temperature setting is 29.5° C. or more, the color display will be red. In the example in FIG. 6, the temperature setting of the air conditioner 20 for blowing air to the right seat is set to 17° C. Therefore, the wave patterns displayed in the touch areas 610 and 630 are displayed in blue. In addition, the temperature setting of the air conditioner 20 for blowing air to the left seat is set to 30° C., and the wave patterns displayed in the touch areas 640 and 660 are displayed in red. In this way, the display screen of the display 10 includes a color image (corresponding to the wave pattern image in FIG. 6) representing the magnitude of the temperature setting of the air conditioner 20 in color, and in a case where the temperature setting is equal to or higher than a predetermined temperature threshold, the color of the color image becomes red, and when the temperature setting is less than the temperature threshold, the color of the color image becomes blue. Thus, it is possible to know the temperature setting of the air conditioner 20 from the color. Note that the color display according to the temperature setting is not limited to the wave patterns within the touch areas 610 to 660, and may be applied to, for example, the numbers on the temperature meters 91*a* and 92*a*. Furthermore, in the example in FIG. 6, the color indicating the temperature setting may be displayed attached to the air images 61 and 62 instead of the wave patterns.

As described above, in the air conditioning control system according to the present embodiment, the controller 30 displays the display screen including the seat image 50 and the reference area image 40 on the touch panel display 10, in a case where the touch operation on the display screen of the display 10 has a direction from the reference area image 40 to the seat image 50, the controller 30 outputs a control command to increase the airflow of the air coming out from the air conditioner 20, and in a case where the touch operation has a direction from the seat to the reference area, the controller 30 outputs a control command to decrease the airflow of the air coming out from the air conditioner 20. In addition, in the present embodiment, the air conditioning control method executed by the controller 30 includes outputting a control command for displaying a display screen including the seat image 50 and the reference area image 40 on the touch panel display 10, and in a case where the touch operation on the display screen of the display 10 has a direction from the reference area image 40 to the seat image 50, outputting a control command to increase the airflow of the air coming out from the air conditioner 20, and in a case where the touch operation has a direction from the seat to the reference area, outputting a control command to decrease the airflow of the air coming out from the air conditioner 20. Thus, touch operations that follow the airflow or touch operations that go against the airflow are possible, and the user can intuitively operate the air conditioner 20. As a result, it is possible to improve the operability when operating the air conditioner 20 by touch operation on the display screen.

Moreover, in the present embodiment, the seat images include a right seat image 51 representing the right seat and a left seat image 52 representing the left seat in a case where the direction of travel of the vehicle is the front. Thus, the passenger is able to know from the display screen of the display 10 that the airflow out toward the left and right seats can be controlled by a touch operation on the display. Further, the reference area image 40 is located between the right seat image 51 and the left seat image 52 on the display screen. Thus, the passenger is able to know that in order to adjust the airflow, only a directional touch operation based on the reference area image need be performed.

In addition, in the present embodiment, the right seat image 51 and the left seat image 52 are displayed on the display screen in the arrangement when each seat is viewed from the rear. Thus, the passenger is able to know from the display screen the relationship between the positions of the seats arranged in the vehicle interior and the controlled air. As a result, the user can intuitively operate the air conditioner 20.

Moreover, in the present embodiment, the seats represented by the right seat image 51 and the left seat image 52 face the reference area image on the display screen. Thus, the passenger is able to know from the display screen the relationship between the positions of the seats arranged in the vehicle interior and the controlled air. As a result, the user can intuitively operate the air conditioner 20.

Furthermore, in the present embodiment, the reference area image 40 includes a fan icon 41 imitating a fan and is located in the central portion of the display screen, the left seat image is located on the left side of the reference area image on the display screen, the right seat image 51 is located on the right side of the reference area image on the display screen, and the left seat image 52 is located on the left side of the reference area image on the display screen. Thus, the passenger is able to feel from the display screen that the air from the fan is flowing toward the left and right seats. As a result, the user can intuitively operate the air conditioner 20.

In addition, in the present embodiment, in a case where the synchronization switch button 70 is ON, the controller 30 outputs a control command for controlling the output of both the right seat air and the left seat air in response to the touch operation, and in a case where the synchronization switch button 70 is OFF, the controller 30 outputs a control command for controlling the output of either the right seat air or the left seat air in response to a touch operation. Moreover, in a case where the synchronization switch button 70 is ON, the controller 30 outputs a control command for controlling any one of the airflow, the air direction, and the temperature of both the right seat air and the left seat air in response to the touch operation, and in a case where the synchronization switch button 70 is OFF, the controller 30 outputs a control command for controlling any one of the airflow, the air direction, and the temperature of either the right seat air or the left seat air in response to the touch operation. This makes it possible to switch between a mode in which the air for the left and right seats can be controlled synchronously, and a mode in which the air can be controlled in one side.

Furthermore, in the present embodiment, the display screen includes an airflow image represented by patterns between the seat image 50 and the reference area image 40, and the number of patterns displayed from the reference area image to the seat image increases as the airflow increases. This makes it possible for the user to easily know the airflow.

In addition, in the present embodiment, the reference area image 40 includes a plurality of scales 44 surrounding the fan icon 41, and the fan icon 41 has an animation function in which the rotational speed of the fan changes according to the air speed of the air coming out from the air conditioner 20, and the plurality of scales increases or decreases depending on the airflow of the air coming out from the air conditioner 20. Thus, the user is able to easily know the airflow.

Moreover, in the present embodiment, the display screen includes temperature adjustment bars 81 and 82 that can adjust the temperature setting of the air conditioner 20 by a first touch operation in one direction and a second touch operation in the other direction, in a case where the temperature adjustment bars 81 and 82 are operated by the first touch operation, the controller 30 outputs a control command to raise the temperature setting, and in a case where the temperature adjustment bars 81 and 82 are operated by the second touch operation, the controller 30 outputs a control command to lower the temperature setting. Thus, the user is able to intuitively operate the air conditioner 20.

Furthermore, in the present embodiment, the display screen includes a color image representing the magnitude of the temperature setting of the air conditioner 20 in color, and in a case where the temperature setting is equal to or higher than a predetermined temperature threshold, the color becomes red, and in a case where the temperature setting is less than the temperature threshold, the color becomes blue. This makes it possible for the user to easily know the temperature setting.

In addition, in the present embodiment, in a case where the operation speed of the touch operation is equal to or less than a predetermined speed threshold, the controller 30 sets the unit of change in the temperature setting to the minimum unit. Thus, the user is able to easily change the adjustment range of the temperature setting.

Moreover, in the present embodiment, in a case where the touch areas 610 and 640 (corresponding to the "first touch area" of the present invention) are touched, the controller 30 outputs a control command to control the output of the air output from the front air outlet, in a case where the touch areas 620 and 650 (corresponding to the "second touch area" of the present invention) are touched, the controller 30 outputs a control command to control the defroster, and in a case where the touch areas 630 and 660 (corresponding to the "third touch area" of the present invention) are touched, the controller 30 outputs a control command to control the output of air from the lower air outlet. Thus, the user is able to intuitively operate the air conditioner 20.

Figure 8:
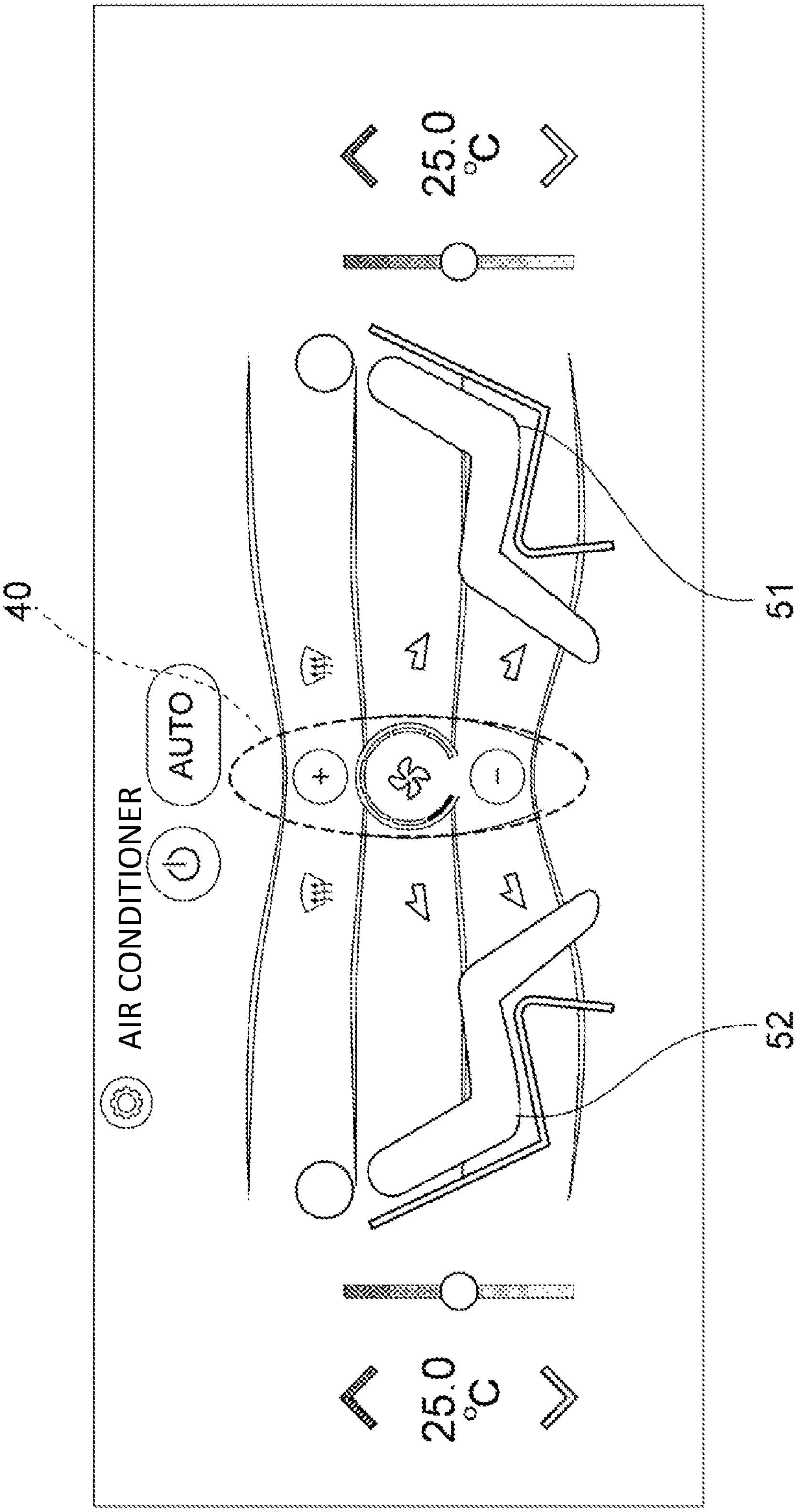
FIG. 8 is a diagram illustrating a display screen of a display in an air conditioning control system according to a modification of the present embodiment.

Furthermore, as a modification of the present embodiment, the right seat image 51 and the left seat image 52 may be displayed on the display screen of the display 10 with the seats facing each other. FIG. 8 is a diagram illustrating a display screen of the display 10 according to a modification. As illustrated in FIG. 8, the right seat image 51 and the left seat image 52 are oriented horizontally and arranged so that the front of the seat faces the reference area. Thus, the passenger is able to know the positional relationship between the seat and the controlled air on the display screen. As a result, the user can intuitively operate the air conditioner 20.

Note that, in the present embodiment, the display screen displays two seat images and the control method and operation method for controlling the air toward the two seats have been described; however, it is also possible for the display screen of the display 10 to display one seat image and to control the air toward one seat in response to a touch operation on the display 10. For example, the controller 30 causes the display 10 for the right seat to display an image including the reference area image 40 and corresponding to the right half of the display screens of FIGS. 3 to 5, and causes the left seat display 10 to display an image including the reference area image 40 and corresponding to the left half of the display screens of FIGS. 3 to 5. The controller 30 then controls the air flowing out from the air conditioner to the right seat in response to a touch operation on the display 10 for the right seat. In addition, the controller 30 controls the air flowing out from the air conditioner 20 to the left seat in response to a touch operation on the display 10 for the left seat. Note that the above-mentioned method may be applied as appropriate to the operation method for operating the display screen and the control method for controlling the air conditioner 20 Thus, touch operations that follow the airflow or touch operations that go against the airflow are possible, and the user can intuitively operate the air conditioner 20. As a result, it is possible to improve the operability when operating the air conditioner 20 by touch operation on the display screen. Furthermore, in the present embodiment, three or more seat images may be displayed on the display screen of the display 10, and the air toward each seat may be controlled in response to a touch operation on the display 10.

Note that the embodiments described above are described to facilitate understanding of the present invention, and are not described to limit the present invention. Therefore, each element disclosed in the above embodiments is intended to include all design changes and equivalents that fall within the technical scope of the present invention.

DESCRIPTION OF REFERENCE NUMERALS

1 Air conditioning control system
10 Display
11 Main switch button
12 Mode switch button
13 Steering wheel icon
20 air conditioner
30 Controller
31 Display control portion
32 Air conditioning control portion
40 Reference area image
50 Scat image
51 Right seat image
52 Left seat image

The invention claimed is:

1. An air conditioning control device that controls an air conditioner installed in a vehicle, comprising
- a controller that controls a display screen of a touch panel display and controls the air conditioner based on a touch operation on the display screen, wherein
- the display screen includes a seat image representing a seat and a reference area image representing a reference area, and
- the controller:
  - in a case where the touch operation has a direction from the reference area image to the seat image, outputs a control command to increase airflow of air coming out from the air conditioner; and
  - in a case where the touch operation has a direction from the seat image to the reference area image, outputs a control command to decrease the airflow of the air coming out from the air conditioner, wherein:
  - the seat image includes a right seat image representing a right seat and a left seat image representing a left seat in a case where a traveling direction of the vehicle is taken to be a front;
  - the reference area image is located between the right seat image and the left seat image on the display screen;
  - the display screen includes a plurality of touch areas provided between the reference area image, the right seat image, and the left seat image;
  - the plurality of touch areas includes a plurality of scales representing a magnitude of airflow; and
  - as an airflow level increases, a number of displayed scales increases.

2. The air conditioning control device according to claim 1, wherein
- the right seat image and the left seat image are displayed on the display screen in an arrangement when each seat is viewed from a rear, or in an arrangement in which the seats face each other.

3. The air conditioning control device according to claim 1, wherein
- the seats represented by the right seat image and the left seat image face the reference area image on the display screen.

4. The air conditioning control device according to claim 1, wherein the reference area image includes a fan icon resembling a fan and is located in a central portion of the display screen, the right seat image is located on a right side of the reference area image on the display screen, and the left seat image is located on a left side of the reference area image on the display screen.

5. The air conditioning control device according to claim 1, wherein the display screen includes a synchronization switch button for synchronously adjusting right seat air coming out from the air conditioner toward the right seat and left seat air coming out from the air conditioner toward the left seat, and the controller:

in a case where the synchronization switch button is ON, outputs a control command for controlling output of both the right seat air and the left seat air in response to the touch operation; and in a case where the synchronization switch button is OFF, outputs a control command for controlling output of one of the right seat air and the left seat air in response to the touch operation.

6. The air conditioning control device according to claim 5, wherein the controller:

in a case where the synchronization switch button is ON, outputs a control command for controlling any one of airflow, air direction, and temperature of both the right seat air and the left seat air in response to the touch operation; and in a case where the synchronization switch button is OFF, outputs a control command for controlling any one of airflow, air direction, and temperature of one of the right seat air and the left seat air in response to the touch operation.

7. The air conditioning control device according to claim 1, wherein the reference area image includes a fan icon that resembles a fan.

8. The air conditioning control device according to claim 7, wherein the reference area image includes a plurality of scales surrounding the fan icon, the fan icon has an animation function in which a rotational speed of the fan changes depending on speed of the air coming out from the air conditioner, and the plurality of scales increase or decrease depending on the airflow of the air coming out from the air conditioner.

9. The air conditioning control device according to claim 1, wherein the display screen includes an adjustment icon that can adjust a temperature setting of the air conditioner by a first touch operation in one direction and a second touch operation in another direction, and the controller:

in a case where the adjustment icon is operated by the first touch operation, outputs a control command to increase the temperature setting; and in a case where the adjustment icon is operated by the second touch operation, outputs a control command to decrease the temperature setting.

10. The air conditioning control device according to claim 1, wherein the display screen includes a color image that represents magnitude of the temperature setting of the air conditioner in color, in a case where the temperature setting is equal to or higher than a predetermined temperature threshold, the color becomes red, and in a case where the temperature setting is less than the temperature threshold, the color becomes blue.

11. The air conditioning control device according to claim 1, wherein the controller:

controls the temperature setting of the air conditioner in response to the touch operation; and in a case where operation speed of the touch operation is equal to or less than a predetermined speed threshold, sets a unit of change in the temperature setting to a minimum unit.

12. The air conditioning control device according to claim 1, wherein the air conditioner includes a defroster, a front air outlet configured to blow air toward a front of the seat, and a lower air outlet configured to blow air toward a lower portion of the seat, the display screen includes, between the seat image and the reference area image, a first touch area for enabling the touch operation for adjusting air from the front air outlet, a second touch area for enabling a touch operation for controlling the defroster, and a third touch area for enabling the touch operation for adjusting air from the lower air outlet, and the controller, in a case where the first touch area is touched, outputs a control command to control output of the air output from the front air outlet, in a case where the second touch area is touched, outputs a control command to control the defroster, and in a case where the third touch area is touched, outputs a control command to control output of the air from the lower air outlet.

13. An air conditioning control method for controlling an air conditioner installed in a vehicle, comprising:

outputting a control command to display a display screen including a seat image representing a seat and a reference area image representing a reference area on a touch panel display;

in a case where a touch operation on the display screen has a direction from the reference area image to the seat image, outputting a control command to increase airflow of air coming out from the air conditioner; and in a case where the touch operation has a direction from the seat image to the reference area image, outputting a control command to decrease the airflow of the air coming out from the air conditioner, wherein the seat image includes a right seat image representing a right seat and a left seat image representing a left seat in a case where a traveling direction of the vehicle is taken to be a front;

the reference area image is located between the right seat image and the left seat image on the display screen;

the display screen includes a plurality of touch areas provided between the reference area image, the right seat image, and the left seat image;

the plurality of touch areas includes a plurality of scales representing a magnitude of airflow; and as an airflow level increases, a number of displayed scales increases.

* * * * *